No. 612,617. Patented Oct. 18, 1898.
W. L. SHEPARD.
CYCLOMETER ATTACHMENT FOR BICYCLES.
(Application filed Nov. 9, 1897.)
(No Model.)
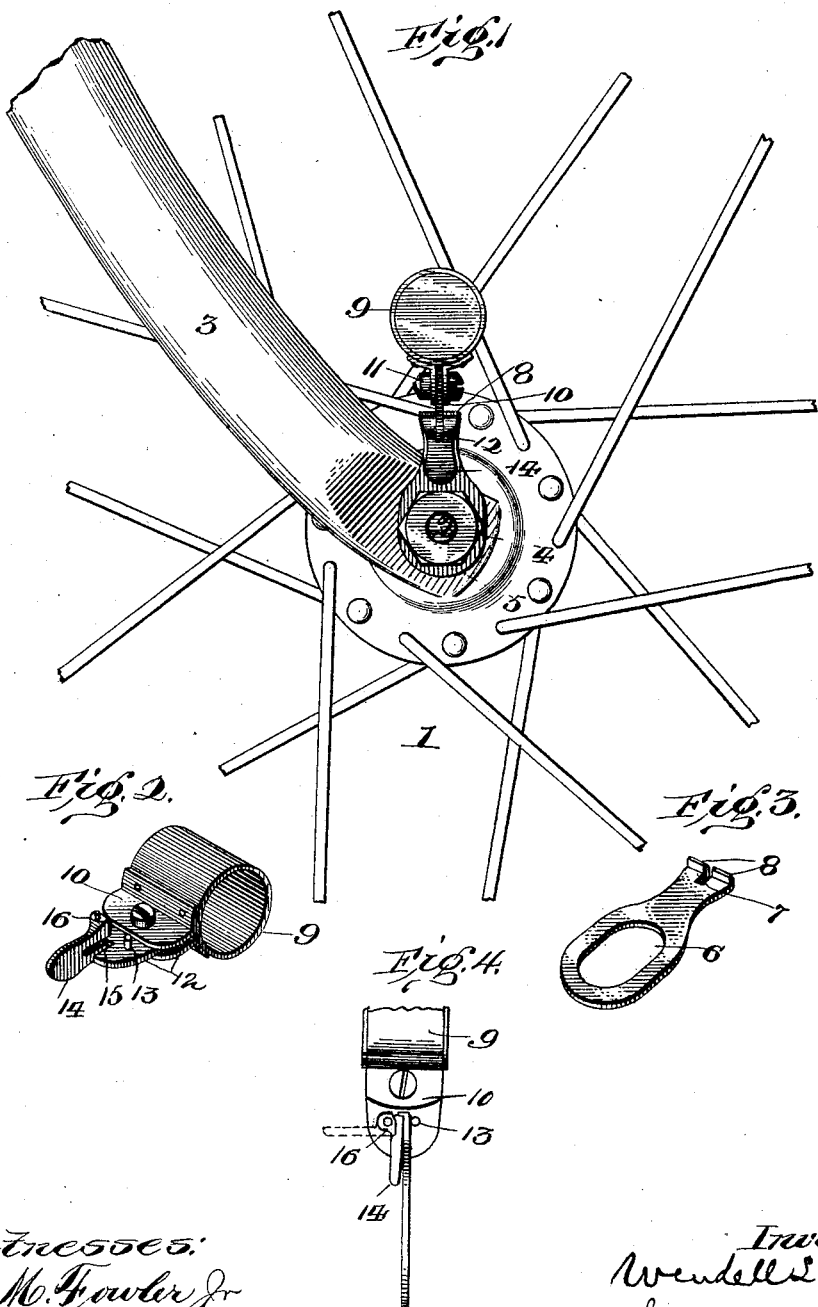

UNITED STATES PATENT OFFICE.

WENDELL L. SHEPARD, OF WATERBURY, CONNECTICUT.

CYCLOMETER ATTACHMENT FOR BICYCLES.

SPECIFICATION forming part of Letters Patent No. 612,617, dated October 18, 1898.

Application filed November 9, 1897. Serial No. 657,934. (No model.)

*To all whom it may concern:*

Be it known that I, WENDELL L. SHEPARD, a citizen of the United States, residing at Waterbury, in the county of New Haven, State of Connecticut, have invented certain new and useful Improvements in Cyclometer Attachments for Bicycles, of which the following is a description, reference being had to the accompanying drawings and to the figures of reference marked thereon.

The invention relates to an improved device for attaching a cyclometer to a bicycle or other vehicle; and the object of the invention is to provide an improved device of this character which is simple in construction and operation and by means of which a cyclometer may be easily and quickly attached to or detached from the vehicle.

Primarily, the invention comprises the combination, with a cyclometer-case and a part on the vehicle to which it is to be attached, of a clamping-lever for securing said cylometer to the vehicle part referred to.

Secondly, the invention comprises the combination, with a part secured to the vehicle and a cyclometer-case, of a clamping-lever pivoted to the cyclometer-case and adapted, when manipulated, to bind against the part secured to the vehicle.

Thirdly, the invention includes an arm secured to the vehicle-axle, a cyclometer-case having a downwardly-extending projection with a lateral projection thereon, and a clamping-lever pivoted on said downward projection, between which lever and the lateral projection the arm passes.

Finally, the invention consists in the matters hereinafter described, and referred to in the appended claims.

The invention is illustrated in the accompanying drawings, in which—

Figure 1 is a side elevation of a portion of a bicycle, showing a cyclometer secured thereon by my invention. Fig. 2 is a detail view of the cyclometer-case, with the clamping-lever thereon. Fig. 3 is a detail view of the arm on the front-wheel axle to which the cyclometer is clamped. Fig. 4 represents a front elevation of the cyclometer with the attaching means applied thereto, the clamping-lever being shown both in its clamping and non-clamping position.

In the drawings, 1 is the front wheel of a bicycle, and 2 the axle thereof, supported in the front fork 3. Secured upon the axle, between the fork 3 and the nut 4, is the arm or plate 5, having opening 6 fitting over the axle. It is formed of spring metal and at its upper end is slotted at 7 and bent inwardly to form shoulders 8.

The cyclometer-case and cyclometer used are preferably of the construction shown in the patent granted to me on the 14th day of September, 1897, No. 589,910, the case comprising a barrel 9, having the downwardly-projecting lugs 10, between which is secured, by bolt 11, the plate 12. It will be understood that it is not desired to be limited herein to the precise manner in which the plate 12 is formed, as it may be simply a projection from the cylinder-case or attached thereto in any suitable way. This plate 12 is provided on either face with a projection 13, formed in this instance of a pin passing through the plate, and there is also pivoted to the plate 12 a cam-lever 14, slotted to embrace the plate 12 and having the two cam-shoulders 16. The plate has a vertical slot, as shown at 15, within which fits the upper end of the plate 6. When the plate 12 is put in position on the plate or arm 6, the upper portion of the latter lies between the projections 13 and cam-lever 14, and the latter when swung to clamping position will wedge tightly against the plate 6, thus rigidly holding the cyclometer thereon.

It will be understood that various minor modifications and changes in the details of construction of the attachment may be made without departing from the spirit of the invention.

Having thus described the invention, what is claimed is—

1. The combination with a cyclometer-case, and a part on the vehicle to which it is to be attached of a clamping-lever permanently pivotally secured to one of said members, and adapted when manipulated to bind against the other member; substantially as described.

2. The combination with a cyclometer-case, and a part on the vehicle to which it is to be attached, of a clamping-lever permanently pivotally secured to one of said members and having a cam-surface, a projection on said member, said other member being clamped between the cam-surface and the projection; substantially as described.

3. The combination with the plate or arm secured to the vehicle, a cyclometer-case having a projecting plate or arm, a lateral projection thereon, and a clamping-lever pivoted on said projecting plate or arm between which lever and the lateral projection, the plate or arm on the vehicle passes; substantially as described.

4. An attachment for securing a cyclometer to a bicycle comprising a plate 6, secured to the bicycle and slotted at its upper end, a plate secured to the cyclometer-case over which the slot in the first plate fits, lateral projections on opposite sides of said second plate and a slotted cam-lever pivoted to said second plate and bearing against the plate 6 holding it against the projections; substantially as described.

5. An attachment for securing a cyclometer to a bicycle comprising a plate 6 secured to the bicycle slotted at its upper end and having shoulders, a plate secured to the cyclometer-case, lateral projections on opposite sides of said plate and a slotted cam-lever pivoted to said second plate, its shoulders bearing against the plate 6 and beneath the shoulders thereof; substantially as described.

In testimony whereof I affix my signature in presence of two witnesses.

WENDELL L. SHEPARD.

Witnesses:
H. A. CHRISTIE,
W. L. KING.